(12) United States Patent
Moasher et al.

(10) Patent No.: US 11,511,614 B2
(45) Date of Patent: Nov. 29, 2022

(54) ROTOR CARRIER CONNECTION

(71) Applicant: Schaeffler Technologies AG & Co. KG, Herzogenaurach (DE)

(72) Inventors: Mohammad Moasher, Fairlawn, OH (US); John Ramsey, Mansfield, OH (US); Thomas Heck, Wooster, OH (US); Carl Adler, Sagamore Hills, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 429 days.

(21) Appl. No.: 16/743,658

(22) Filed: Jan. 15, 2020

(65) Prior Publication Data

US 2020/0386281 A1 Dec. 10, 2020

Related U.S. Application Data

(60) Provisional application No. 62/859,392, filed on Jun. 10, 2019.

(51) Int. Cl.
*B60K 17/02* (2006.01)
*B60K 6/405* (2007.10)
*B60K 6/26* (2007.10)
*H02K 7/00* (2006.01)
*B60K 6/48* (2007.10)
*H02K 1/28* (2006.01)

(52) U.S. Cl.
CPC ............... *B60K 6/405* (2013.01); *B60K 6/26* (2013.01); *B60K 17/02* (2013.01); *H02K 7/006* (2013.01); *B60K 2006/4825* (2013.01); *B60Y 2200/92* (2013.01); *B60Y 2400/426* (2013.01); *H02K 1/28* (2013.01)

(58) Field of Classification Search
CPC ..................... B60K 17/02; B60K 2006/4825
See application file for complete search history.

(56) References Cited

U.S. PATENT DOCUMENTS

| 6,327,766 B1 * | 12/2001 | Cardente .................. B23P 6/00 29/402.09 |
| 7,234,577 B2 * | 6/2007 | Masuya .................. F16H 45/02 192/3.3 |
| 9,917,482 B2 | 3/2018 | Lindemann et al. |
| 10,352,422 B2 | 7/2019 | Satyaseelan et al. |
| 2011/0240430 A1 * | 10/2011 | Iwase ..................... B60K 6/405 903/914 |

(Continued)

FOREIGN PATENT DOCUMENTS

| CN | 103161908 A * | 6/2013 | ............... B60K 6/26 |
| JP | 2019044845 A * | 3/2019 | |

*Primary Examiner* — Stacey A Fluhart

(57) ABSTRACT

A rotor for a hybrid drivetrain includes a rotor carrier, at least one rotor segment, and a torque converter. The rotor carrier has a first tubular portion with an outer surface, and an annular portion with a first through hole. The at least one rotor segment is installed on the outer surface. The torque converter has an impeller with a first shell and a plurality of first blades fixed to the first shell, a cover with a second shell fixed to the first shell to form a hydraulic chamber and a fastener fixed to the second shell and extending through the first through hole, and a turbine disposed in the hydraulic chamber and including a third shell and a plurality of second blades fixed to the second shell.

18 Claims, 2 Drawing Sheets

(56) References Cited

U.S. PATENT DOCUMENTS

2012/0152678 A1* 6/2012 Sarnie .................... F16H 45/02
192/3.3
2015/0021137 A1* 1/2015 Lindemann ............. F16H 45/02
192/3.29

* cited by examiner

ROTOR CARRIER CONNECTION

CROSS-REFERENCE TO RELATED APPLICATIONS

This application claims the benefit of U.S. Provisional Patent Application No. 62/859,392, filed Jun. 10, 2019, the disclosure of which is incorporated in its entirety by reference herein.

TECHNICAL FIELD

The present disclosure relates generally to a rotor carrier, and more specifically to a rotor carrier connection to a torque converter.

BACKGROUND

Rotor carriers connected to torque converters are known. One example is shown in commonly-assigned U.S. Pat. No. 10,352,422 titled ROTOR CARRIER AND FLANGE ASSEMBLY to Satyaseelan et al, hereby incorporated by reference as if set forth fully herein.

SUMMARY

Example aspects broadly comprise a rotor for a hybrid drivetrain including a rotor carrier, at least one rotor segment, and a torque converter. The rotor carrier has a first tubular portion with an outer surface, and an annular portion with a first through hole. The at least one rotor segment is installed on the outer surface. The torque converter has an impeller with a first shell and a plurality of first blades fixed to the first shell, a cover with a second shell fixed to the first shell to form a hydraulic chamber and a fastener fixed to the second shell and extending through the first through hole, and a turbine disposed in the hydraulic chamber and including a third shell and a plurality of second blades fixed to the third shell. In an example embodiment, the first through hole is a plurality of first through holes, and the fastener is a plurality of fasteners each extending through a one of the plurality of first through holes.

In some example embodiments, the rotor has comprises a second tubular portion extending from the annular portion, and the second shell comprises a third tubular portion installed into the second tubular portion to radially position the cover relative to the rotor carrier. In an example embodiment, the rotor carrier has a first conical portion extending from the second tubular portion, and the second shell has a second conical portion extending from the third tubular portion and parallel to the first conical portion. In an example embodiment, the torque converter has a clutch piston disposed in the hydraulic chamber and sealed to the third tubular portion.

In an example embodiment, the rotor has a clutch plate. The first tubular portion has an inner spline portion, the clutch plate has an outer spline portion installed in the inner spline portion to rotationally connect the clutch plate to the rotor carrier. In an example embodiment, the rotor has a rotational axis, the at least one rotor segment has an outer surface with a first radius measured from the rotational axis, and the fastener is disposed at a second radius measured from the rotational axis and greater than the first radius. In an example embodiment, the fastener is a stud projection welded to the second shell.

In some example embodiments, the second shell has a second through hole and the fastener is a stud installed in the second through hole and welded to the second shell. In an example embodiment, the second shell has a counterbore aligned with the second through hole and the stud has a head disposed in the counterbore. In an example embodiment, the stud is welded to the second shell by laser welding that forms a liquid-tight seal between the stud and the second shell.

Other example aspects broadly comprise a hybrid module for a vehicle including the rotor, a module housing, and a stator installed in the module housing and radially aligned with the at least one rotor segment. In an example embodiment, the module housing is arranged for fixing to a transmission housing and to an internal combustion engine. In an example embodiment, the hybrid module includes a transmission housing fixed to the module housing, and the torque converter is at least partially disposed within the transmission housing. Other example aspects broadly comprise a method of assembling a hybrid drivetrain including providing a transmission with a torque converter having a stud, providing a hybrid module with a rotor carrier having a through hole, inserting the stud through the through hole, and fixing the torque converter to the rotor carrier with a nut installed on the stud. In some example embodiments, the stud is a plurality of studs. the through hole is a plurality of through holes, each one of the plurality of studs is installed in a one of the plurality of through holes, and the nut is a plurality of nuts each installed on a one of the plurality of studs. In an example embodiment, the transmission has a transmission housing with an access hole, and the method includes rotating the torque converter to align each one of the plurality of studs with the access hole to install each one of the plurality of nuts. In an example embodiment, the transmission has a transmission housing, the hybrid module has a module housing, and the method includes fixing the transmission housing to the module housing.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only, and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

Figure 1:
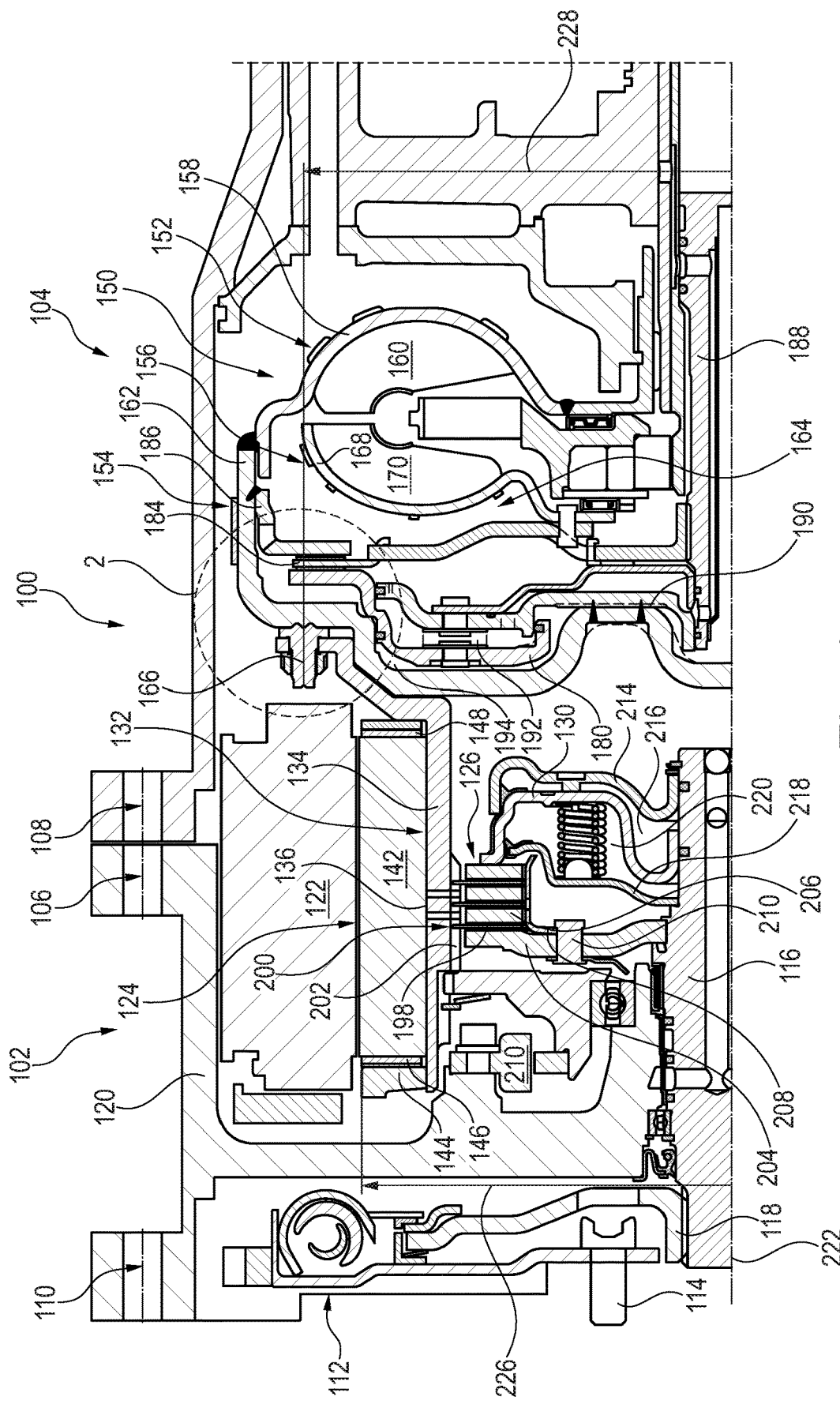
FIG. 1 illustrates a top half cross-sectional view of a hybrid drivetrain for a vehicle according to an example aspect of the present disclosure.
Figure 2:
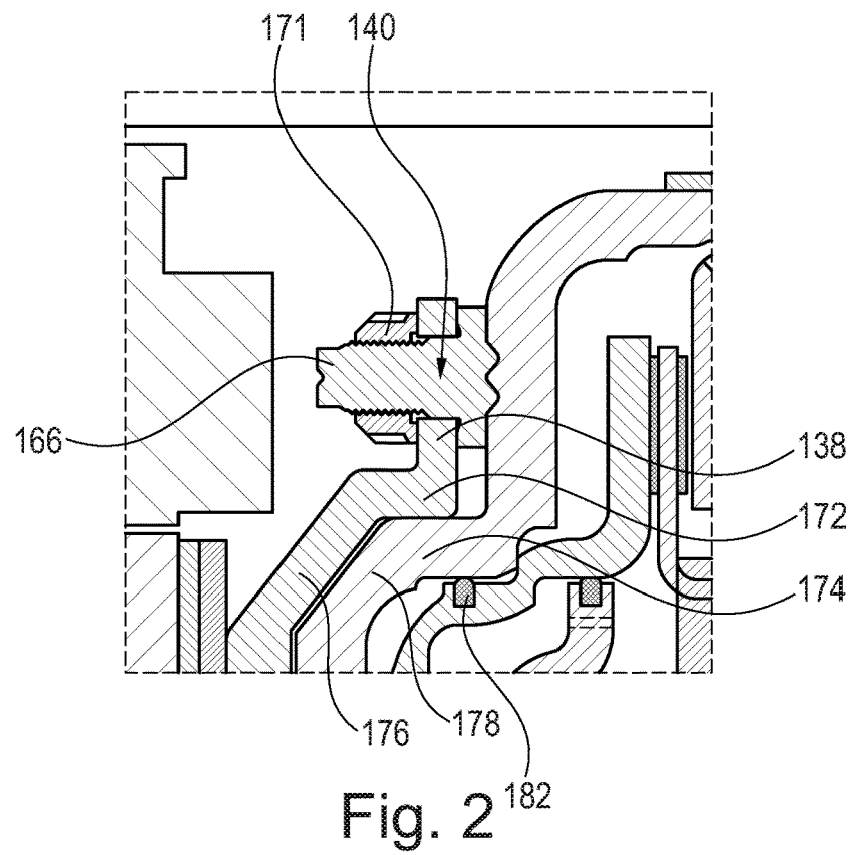
FIG. 2 illustrates a detail view of encircled region 2 in FIG. 1.

The following description is made with reference to FIGS. 1-2. FIG. 1 illustrates a top half cross-sectional view of a hybrid drivetrain for a vehicle according to an example aspect of the present disclosure. FIG. 2 illustrates a detail view of encircled region 2 in FIG. 1. Hybrid drivetrain 100 includes hybrid module 102 fixed to multi-speed transmission 104 with bolts (not shown) installed in respective holes 106/108, for example. Hybrid module 102 is arranged for fixing to an internal combustion engine (not shown) at holes 110, for example. Damper 112 is fixed to a crankshaft (not shown) of the engine at crankshaft bolts 114 and splined to module shaft 116 at hub 118.

Hybrid module 102 includes housing 120, stator 122, installed in the housing, and rotor 124, rotatable relative to the stator and forming an electric motor to drive the vehicle. Clutch 126 selectively connects the rotor to shaft 116 to couple and decouple the engine from the transmission. Clutch 126 includes clutch plates 128 and can be hydraulically applied and released via piston 130 using pressure supplied by transmission 104 or by an external source (not shown), for example.

Rotor 124 includes rotor carrier 132 with tubular portion 134 having outer surface 136, annular portion 138 with through hole 140 (ref. FIG. 2), and rotor segment 142 installed on the outer surface. By installed, we mean the rotor segment is rotates with the rotor carrier and is axially retained on the rotor carrier by end cap 144. Rotor 124 may include non-ferrous (e.g., aluminum) washers 146/148 to limit magnetic flux at opposite axial ends of the rotor segment. Rotor 124 also includes torque converter 150 with impeller 152, cover 154, and turbine 156. The impeller includes shell 158 and blades 160 fixed to the shell. The cover includes shell 162 fixed to shell 158 to form hydraulic chamber 164, and fastener 166 fixed to shell 162 and extending through hole 140. Fastener 166 may be a stud projection welded to cover shell 162, for example. Turbine 156 is disposed in chamber 164 and includes shell 168 and blades 170 fixed to shell 168. It should be noted that, although the FIG. 1 only shows a single hole, the rotor carrier includes a plurality of circumferentially distributed holes 140 and the torque converter includes a plurality of fasteners 166 disposed in the holes. Nut 171 (ref. FIG. 2) fixes the torque converter to the rotor carrier.

Rotor carrier 132 includes tubular portion 172 extending from annular portion 138. Shell 162 includes tubular portion 174 installed into tubular portion 172 to radially position the cover relative to the rotor carrier. Rotor carrier 132 includes conical portion 176 extending from tubular portion 172, and shell 162 includes conical portion 178 extending from tubular portion 174 and parallel to conical portion 176.

Torque converter 150 includes clutch piston 180 disposed in the hydraulic chamber and sealed to tubular portion 174 by seal 182, for example. Piston 180 is arranged to clamp clutch plate 184 between the piston and backing plate 186 to bypass turbine 156 and transmit torque directly from cover 154 to transmission input shaft 188. Balance plate 190 is fixed to cover 154 and rotationally fixed to piston 180 by leaf springs 192. The leaf springs allow axial deflection of the piston relative to the cover and the balance plate. Rotation of the torque converter creates dynamic pressure in apply chamber 194, but that pressure is counteracted by dynamic pressure in balance chamber 196, so only apply pressure acts on piston 180 and controllability of the piston is improved.

Rotor 124 includes clutch plate 128 including outer spline portion 200 installed in inner spline portion 202 of tubular portion 134 to rotationally connect the clutch plate to the rotor carrier. Clutch plate 128 is part of a K0 clutch arranged to selectively connect rotor carrier 132 to module shaft 116, thereby disconnecting the electric motor from the internal combustion engine. The K0 clutch includes backing plate 204 fixed to the module shaft and separator plate 206 drivingly engaged inner carrier 208. The inner carrier is fixed to the backing plate by rivet 210 so that, when piston 130 clamps clutch plate 128 between the backing plate and the separator plate, torque is transmitted between the rotor carrier and the module shaft. Module 102 may include a plurality of clutch plates and separator plates as shown in FIG. 1. Seal plate 214 is sealed to the piston and the module shaft to create apply chamber 216. Balance plate 218 forms balance chamber 220 to provide a balancing effect to piston 130 similar to balance chamber 196 described above.

Rotor 124 includes rotational axis 222. Rotor segment 142 includes outer surface 224 with radius 226 measured from the rotational axis. Fastener 166 is disposed at radius 228 measured from the rotational axis. As can be seen from FIG. 1, radius 228 is greater than radius 226.

Hybrid module 102 for a vehicle (not shown) includes rotor 124, module housing 120, and stator 122 installed in the module housing and radially aligned with the at least one rotor segment. By radially aligned, we mean that at least a portion of the rotor segment and the stator are crossed by a single radial line extending from axis 222. The module housing is arranged for fixing to housing 224 for multi-speed transmission 104 and to an internal combustion engine. As shown in FIG. 1, torque converter 150 is at least partially disposed within the transmission housing.

Figure 3:
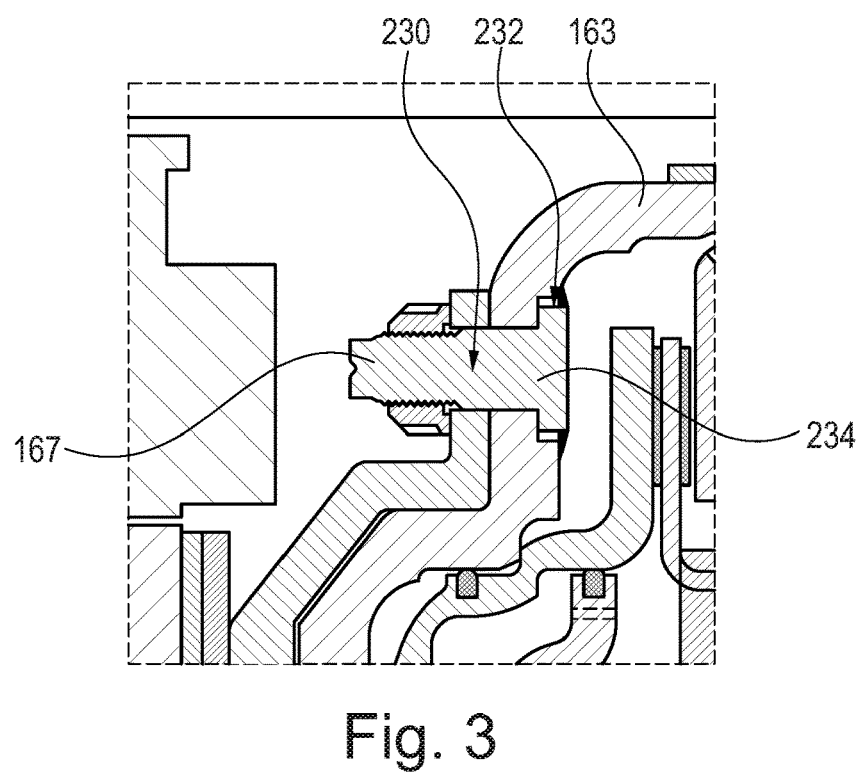
FIG. 3 illustrates a detail view of encircled region 2 in FIG. 1 showing an alternative fastener.

The following description is made with reference to FIG. 3. FIG. 3 illustrates a detail view of encircled region 2 in FIG. 1 showing an alternative fastener. Shell 163 (similar to shell 162 described above except as described below) includes through hole 230. Fastener 167 (similar to fastener 166 except as described below) is a stud installed in through hole 230 and welded to shell 163. Shell 163 includes counterbore 232 aligned with through hole 230 and stud 167 includes head 234 disposed in the counterbore. Stud 167 may be welded to shell 163 by laser welding, for example, to form a liquid-tight seal between the stud and the shell.

The following description is made with reference to FIGS. 1-3. The present disclosure also includes a method of assembling a hybrid drivetrain including providing a transmission with a torque converter having a stud, providing a hybrid module with a rotor carrier having a through hole, inserting the stud through the through hole, and fixing the torque converter to the rotor carrier with a nut installed on the stud. The stud may include a plurality of studs, the through hole may include a plurality of through holes, each one of the plurality of studs may be installed in a one of the plurality of through holes, the nut may include a plurality of nuts each installed on a one of the plurality of studs. The transmission may include a transmission housing with an access hole, and the method may include rotating the torque converter to align each one of the plurality of studs with the access hole to install each one of the plurality of nuts. The transmission may include a transmission housing, the hybrid module may include a module housing, and the method may include fixing the transmission housing to the module housing.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

REFERENCE NUMERALS

100 Hybrid drivetrain
102 Hybrid module
104 Multi-speed transmission
106 Hole (hybrid module to transmission)
108 Hole (transmission to module)
110 Holes (hybrid module to ICE)
112 Damper
114 Crankshaft bolts
116 Module shaft
118 Hub (damper)
120 Hybrid module housing
122 Stator
124 Rotor
126 Clutch (rotor to shaft)
128 Clutch plate (K0)
130 Piston
132 Rotor carrier
134 Tubular portion (first, rotor carrier)
136 Outer surface (first tubular portion)
138 Annular portion (rotor carrier)
140 Through hole (rotor carrier)
142 Rotor segment
144 End cap (rotor)
146 Non-ferrous washer
148 Non-ferrous washer
150 Torque converter
152 Impeller
154 Cover
156 Turbine
158 Shell (first, impeller)
160 Blades (impeller)
162 Shell (second, cover)
164 Hydraulic chamber
166 Fastener
168 Shell (third, turbine)
170 Blades (turbine)
171 Nut
172 Tubular portion (second, rotor carrier)
174 Tubular portion (third, cover)
176 Conical portion (first, rotor carrier)
178 Conical portion (second, cover)
180 Clutch piston
182 Seal (piston to cover)
184 Clutch plate (torque converter)
186 Backing plate
188 Transmission input shaft
190 Balance plate
192 Leaf springs
194 Apply chamber
196 Balance chamber
200 Outer spline portion (clutch plate)
202 Inner spline portion (rotor carrier)
204 Backing plate
206 Separator plate
208 Inner carrier
210 Rivet (inner carrier to backing plate)
214 Seal plate
216 Apply chamber
218 Balance plate
220 Balance chamber
222 Rotational axis
224 Outer surface (rotor segment)
226 Radius (outer surface)
228 Radius (fastener)
230 Through hole (cover, FIG. 3)
232 Counterbore (cover, FIG. 3)
234 Head (fastener, FIG. 3)

What is claimed is:

1. A rotor for a hybrid drivetrain comprising:
a rotor carrier comprising:
a first tubular portion comprising:
an outer surface; and
an inner spline portion; and
an annular portion comprising a first through hole;
at least one rotor segment installed on the outer surface;
a torque converter comprising:
an impeller comprising:
a first shell; and
a plurality of first blades fixed to the first shell;
a cover comprising:
a second shell fixed to the first shell to form a hydraulic chamber; and
a fastener fixed to the second shell and extending through the first through hole; and
a turbine disposed in the hydraulic chamber and comprising:
a third shell; and
a plurality of second blades fixed to the third shell; and a clutch plate comprising an outer spline portion installed in the inner spline portion to rotationally connect the clutch plate to the rotor carrier.

2. The rotor of claim 1 wherein:
the first through hole is a plurality of first through holes; and
the fastener is a plurality of fasteners each extending through a one of the plurality of first through holes.

3. The rotor of claim 1 wherein:
the rotor carrier comprises a second tubular portion extending from the annular portion; and the second shell comprises a third tubular portion installed into the second tubular portion to radially position the cover relative to the rotor carrier.

4. The rotor of claim 3 wherein:
the rotor carrier comprises a first conical portion extending from the second tubular portion; and,
the second shell comprises a second conical portion extending from the third tubular portion and parallel to the first conical portion.

5. The rotor of claim 3 wherein the torque converter further comprises a clutch piston disposed in the hydraulic chamber and sealed to the third tubular portion.

6. The rotor of claim 1 wherein:
the rotor comprises a rotational axis;
the at least one rotor segment comprises an outer surface with a first radius measured from the rotational axis; and
the fastener is disposed at a second radius measured from the rotational axis and greater than the first radius.

7. The rotor of claim 1 wherein the fastener is a stud projection welded to the second shell.

8. The rotor of claim 1 wherein:
the second shell comprises a second through hole; and,
the fastener is a stud installed in the second through hole and welded to the second shell.

9. The rotor of claim 8 wherein:
the second shell comprises a counterbore aligned with the second through hole; and
the stud comprises a head disposed in the counterbore.

10. The rotor of claim 8 wherein the stud is welded to the second shell by laser welding that forms a liquid-tight seal between the stud and the second shell.

11. A hybrid module for a vehicle comprising:
the rotor of claim 1;
a module housing; and
a stator installed in the module housing and radially aligned with the at least one rotor segment.

12. The hybrid module of claim 11 wherein the module housing is arranged for fixing to a transmission housing and to an internal combustion engine.

13. The hybrid module of claim 11 further comprising a transmission housing fixed to the module housing, wherein the torque converter is at least partially disposed within the transmission housing.

14. A method of assembling a hybrid drivetrain comprising:
providing a transmission comprising:
a torque converter comprising a plurality of studs; and
a transmission housing with an access hole;
providing a hybrid module with a rotor carrier comprising a plurality of through holes;
inserting each one of the plurality of studs into a one of the plurality of through holes; and
fixing the torque converter to the rotor carrier with a plurality of nuts installed on the plurality of studs by rotating the torque converter to align each one of the plurality of studs with the access hole to install each one of the plurality of nuts.

15. The method of claim 14 wherein:
the hybrid module comprises a module housing; and
the method further comprises fixing the transmission housing to the module housing.

16. A rotor for a hybrid drivetrain comprising:
a rotor carrier comprising:
a first tubular portion comprising an outer surface;
an annular portion comprising a first through hole; and
a second tubular portion extending from the annular portion;
at least one rotor segment installed on the outer surface; and
a torque converter comprising:
an impeller comprising:
a first shell; and
a plurality of first blades fixed to the first shell;
a cover comprising:
a second shell fixed to the first shell to form a hydraulic chamber, the second shell comprising a third tubular portion contacting the second tubular portion and radially centering the cover relative to the rotor carrier; and
a fastener fixed to the second shell and extending through the first through hole; and
a turbine disposed in the hydraulic chamber and comprising:
a third shell; and
a plurality of second blades fixed to the third shell.

17. The rotor of claim 16 wherein:
the rotor carrier comprises a first conical portion extending from the second tubular portion; and,
the second shell comprises a second conical portion extending from the third tubular portion and parallel to the first conical portion.

18. The rotor of claim 16 wherein the torque converter further comprises a clutch piston disposed in the hydraulic chamber and sealed to the third tubular portion.

* * * * *